United States Patent [19]

Porges

[11] Patent Number: 4,930,356

[45] Date of Patent: Jun. 5, 1990

[54] FLOWMETER FOR GAS-ENTRAINED SOLIDS FLOW

[75] Inventor: Karl G. Porges, Evanston, Ill.

[73] Assignee: The United States of America as represented by the United States Department of Energy, Washington, D.C.

[21] Appl. No.: 341,004

[22] Filed: Apr. 20, 1989

[51] Int. Cl.$^5$ ............................................. G01F 1/56
[52] U.S. Cl. ................................. 73/861.08; 324/664; 73/861.04
[58] Field of Search ............. 73/861.04, 861.08, 32 R; 324/61 R

[56] References Cited

U.S. PATENT DOCUMENTS

| | | | |
|---|---|---|---|
| 2,665,409 | 1/1954 | Rogers | 324/61 R |
| 3,635,082 | 1/1972 | Prellwitz et al. | |
| 3,926,050 | 12/1975 | Turner et al. | |
| 4,168,466 | 9/1979 | Boldt | 324/61 R |
| 4,569,232 | 2/1986 | Kim | |
| 4,619,145 | 10/1986 | Girgenti | |
| 4,751,842 | 6/1988 | Ekrann et al. | |

FOREIGN PATENT DOCUMENTS 2115933 9/1983 United Kingdom ............... 73/32 R

Primary Examiner—Charles A. Ruehl
Attorney, Agent, or Firm—Frank J. Kozak; Paul A. Gottlieb; William R. Moser

[57] ABSTRACT

An apparatus and method for the measurement of solids feedrate in a gas-entrained solids flow conveyance system. The apparatus and method of the present invention include a vertical duct connecting a source of solids to the gas-entrained flow conveyance system, a control valve positioned in the vertical duct, and a capacitive densitometer positioned along the duct at a location a known distance below the control valved so that the solid feedrate, Q, of the gas entrained flow can be determined by $$Q = S\rho\phi V_S$$

where S is the cross sectional area of the duct, $\rho$ is the density of the solid, $\phi$ is the solid volume fraction determined by the capacitive densitometer, and $v_S$ is the local solid velocity which can be inferred from the konown distance of the capacitive densitometer below the control valve.

15 Claims, 3 Drawing Sheets

FLOWMETER FOR GAS-ENTRAINED SOLIDS FLOW

CONTRACTUAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

This invention relates to the flow measurement of solids that are fed into systems where such solids are conveyed by gas-entrainment. Gas-entrained solids flow is currently widely used in the mineral and chemical processing industry for conveying granular solids and powders within a processing plant. In proposed applications such as coal gasification or liquefaction, crushed coal can be fed to a reactor where it is converted to process gas in the first stage of the process. The yield of this conversion depends upon maintaining a stoichiometrical balance between reagents. Although the gaseous reagents are readily controlled and their feedrate is readily measured by known methods, the feedrate of gas-entrained solids is very difficult to measure at all and cannot be measured with a high degree of accuracy by present commercially available methods.

In a typical pneumatic conveyor, solids are injected into the gas stream through a mixing tee after descending vertically from a feedhopper that is restocked either intermittently or semi-continuously. A rough estimate of the solids flowrate can be obtained in the form of a load cell support apparatus associated with a feedhopper. The measurement obtained in this manner is at best intermittent. A continuous measurement is required for control purposes. Therefore, for gas-entrained conveyance of solids, there exists a need for continuous feedrate measurement of the solids.

Such a continuous measurement could in principle be effected within the conveyor duct, downstream from the solids injection point (mixing tee). However, it must be considered that the solids, upon entering the conveyor duct, undergo continuous acceleration while their concentration diminishes commensurately; the entraining gas also speeds up and the pressure drops over a considerable length of duct. To provide a determination of the solid mass flowrate or feedrate under these conditions therefore requires two measurements simultaneously and at the same duct location, e.g. a density and velocity measurement.

The highly erosive nature of the medium (in which granular solids are propelled at speeds up to 20 m/sec) favors non-intrusive methods for both these measurements. Certain non-intrusive techniques, specifically, capacitive on-line densitometry and cross-correlation processing of signals from a pair of capacitors, have been tried. However, at the present, neither of these measurement techniques can be provided at the desirable level of accuracy (in particular, the cross-correlation velocity readout tends to have a considerable error). Yet another problem, inherent in all hostile media and particularly burdensome for a dual reading scheme, is the difficulty of providing calibration in a situation where no other and more accurate scheme for local velocity/density measurement can be provided at a reasonable cost.

These considerations indicate that, instead of choosing a measurement site downstream from injection, a measurement be made in the vertical duct (downcomer) through which solids enter the gas steam. Here, a number of favorable factors can be exploited:

(1) The conditions, described above, that mandate a circular cross section in the conveyor duct are absent, hence, a rectangular geometry can be chosen. Such a geometry offers an exceptionally uniform sensing field, uniquely associated with a "flat-plate" capacitor. Consequently, the local density measurement can be made with especially high accuracy.

(2) Means can be provided to release the solids in such a way as to allow a close-to-free fall at high dilution. Under those conditions, the velocity at the midplane through the density measurement capacitor can be calculated, with only a small release-factor correction, and thus does not have to be measured.

(3) At relatively high dilution (small solid volume fraction), a highly accurate formula, needed to convert the measured bulk dielectric constant to solid volume fraction, can be provided.

(4) Combining (a) an accurate reading of the local bulk dielectric constant, (b) the accurately calculated particle velocity, and (c) known constants such as the dielectric constant and intrinsic density of the solid and the cross sectional area of the duct, yields a rapid as well as accurate determination of the solids feedrate which, except for fluctuations about an average, must remain constant throughout the conveyor duct.

Another advantage of a measurement site in the vertical duct is its potential for direct, interactive control of the solids feedrate. Such control requires a travel time (delay) between measurement and eventual process vessel injection to compensate for the inevitable lag between measurement reference time and delivery of the computed readout, use of the readout in an interactive control algorithm, and, finally action to reset the valve.

Still other specific advantages of combining capacitive sensing in the vertical feed duct are: operation in a relatively benign medium, hence, absence of problems arising from severe erosion; relatively inexpensive hardware as well as electronics, and ready access to the equipment for maintenance, etc.

Accordingly, it is an object of the present invention to provide an apparatus and method to continuously measure the solids feedrate in a gas entrained solids conveyance system (pneumatic conveyor).

It is a further object of this invention to provide an apparatus and method for solids feedrate measurement that requires no calibration.

It is another object of this invention to provide an apparatus and method for local bulk density measurement that affords a uniform and unbiased sensing of the entire duct cross section.

It is another object of this invention is to provide a means for measurement of the solids feedrate in a pneumatic conveyor system that does not require intrusive devices or probes.

It is yet another object of this invention to provide a measurement site that affords interactive control of the feedrate.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention provides an apparatus and method for the measurement of solids feedrate entering in a gas-entrained solids flow conveyance system. The apparatus and method of the present invention include a vertical duct connecting a source of solids to the gas-entrained flow conveyance system, a control valve positioned in the vertical duct, and a capacitive densitometer positioned along the duct at a known distance below the control valve so that the solid feedrate, Q, of the gas entrained flow can be determined by $$Q = S\rho\phi V_S$$

where S is the cross sectional area of the duct, $\rho$ is the intrinsic density of the solid, $\phi$ is the solid volume fraction determined by the capacitive densitometer, and $V_S$ is the local solid velocity inferred from the known distance of the capacitive densitometer below the control valve.

DETAILED DESCRIPTION OF THE INVENTION

Figure 1:
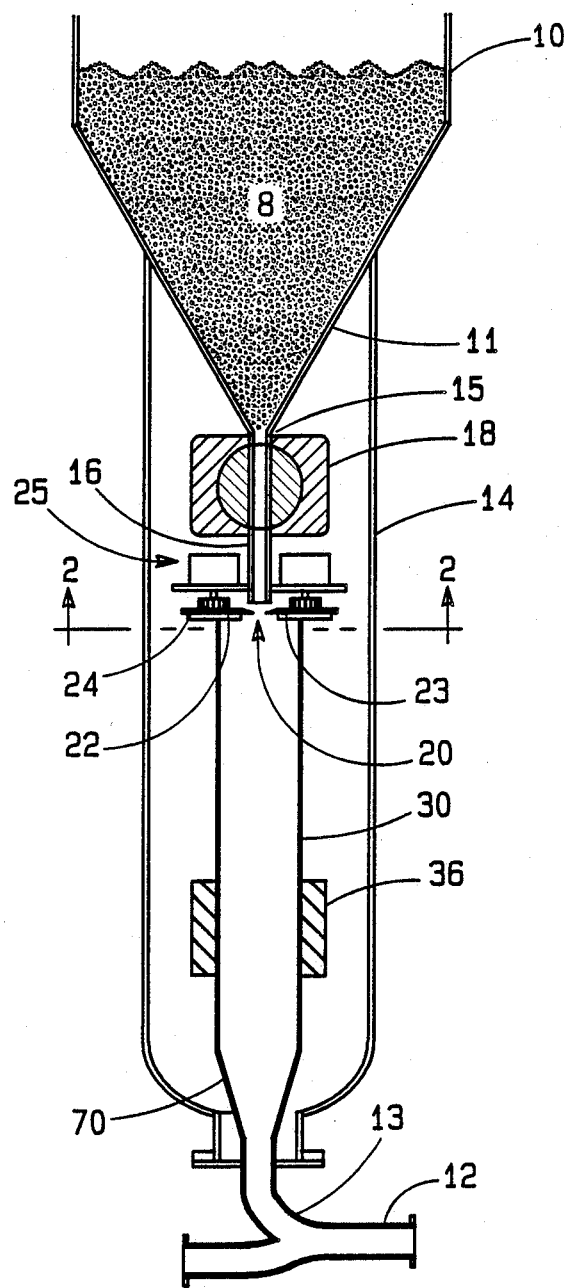
FIG. 1 depicts the present invention as used for continuous online flow measurements from a feed hopper to a pneumatic conveyor mixing tee.

The present invention as used in a system for the feeding and conveyance of a solid via gas entrainment is depicted in FIG. 1. As is usual in systems for the gas entrained conveyance of solids, a supply of solids 8 (suitably comminuted and classified for purposes of pneumatic conveyance) is stored in a feedhopper 10 configured to allow smooth gravity-release of solids at its bottom 11 without need for mechanical devices to avoid bridging. Continuing to flow through the apparatus by gravity, the solids are injected into horizontal gas-entrainment duct 12 (the pneumatic conveyor) via mixing tee 13.

The design of pneumatic conveyance systems is well known and the present invention is intended to be employed with typical systems now in use. In the usual process, a gas under moderate pressure flows at high speed in horizontal duct 12 so that the solid particles, as they drop into horizontal duct 12 by gravity, are entrained by the gas stream.

The entire system requires pressurization at a pressure that typically is less than on atm (14.7) psi, corresponding to the inlet gas pressure at the mixing tee. This can be provided through an outer envelope 14 of cylindrical shape, constructed according to US/ASME code and equipped with suitable gasketed joints and access apertures. The envelope 14, at the same time, provides needed electrical shielding and weather protection (typical feedhopper installations being out-of-doors). Alternatively, the vertical duct sections may be strengthened so as to withstand the indicated pressure range, while electrical shielding, etc. can be provided locally by suitable box structures.

Feedhopper 10 is shaped so as to provide smooth, packed gravity flow of solids, bottoming out in a narrow, quasi-rectangular aperture 15 that connects directly to a short quasi-rectangular vertical duct section 16.

A shutoff valve 18 that may be a cylindrical plug-valve 18 for example is provided in duct section 16 to shut off the solids stream as and when required. Shutoff valve 18 is fully open in normal operation. Below shutoff valve 18 and at the end of duct section 16 is the flow control valve 20. The construction and positioning of flow control valve 20 are designed and intended to produce a thin solids stream along the central plane of rectangular duct 30 which is just below the control valve 20, such that particles on their way down do not "feel" the presence of the duct walls (as they would for conventional knife valve/circular duct downcomer systems).

Figure 2:
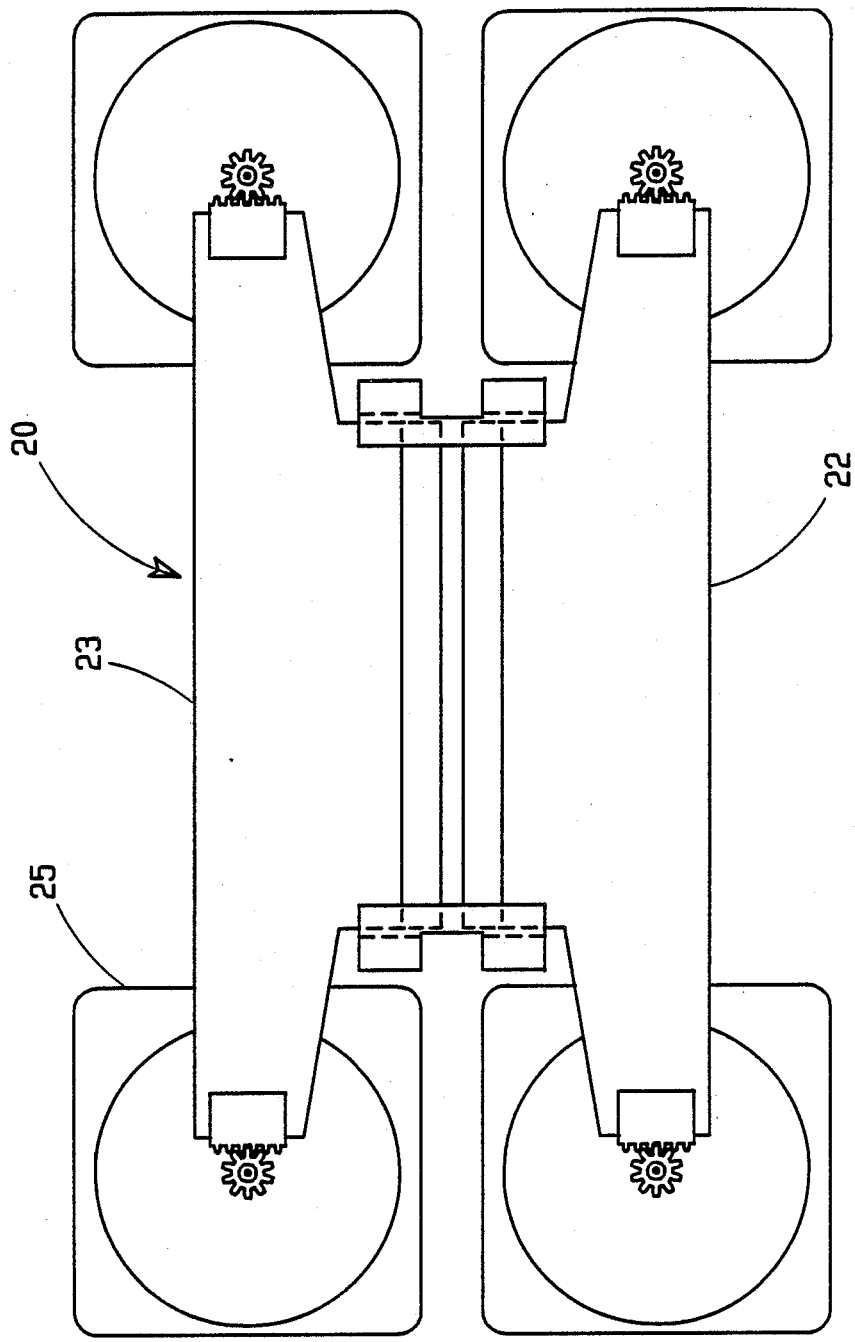
FIG. 2 shows a view of the double-blade control valve along line 2—2' of FIG. 1.

Referring to FIG. 2, there is depicted control valve 20. Blades 22 and 23 travel within slots 24 in the wall of duct 16 driven by a mechanical linkage or by stepping motors 25. The stepping motors are controlled by manual or automatic means, synchronized so as to drive the blades 22 and 23 symmetrically towards each other in suitable steps.

Below control valve 20, the duct profile widens as indicated in FIG. 1, in the free-fall duct section 30. Densitometer 36 is mounted on duct section 30 such that its mid-plane lies a known distance below the control valve blade plane. The enlargement of duct section 30 relative to duct section 16 is by at least 5 cm on all sides, so as to keep all walls well away from the descending solids stream as the latter passes through the capacitive densitometer 36.

Figure 3:
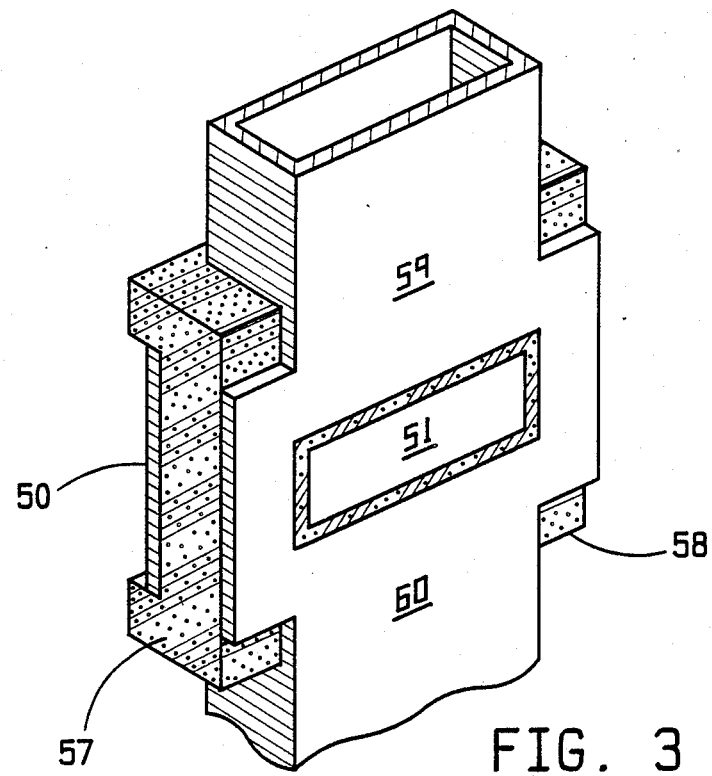
FIG. 3 shows the densitometer.
Figure 4:
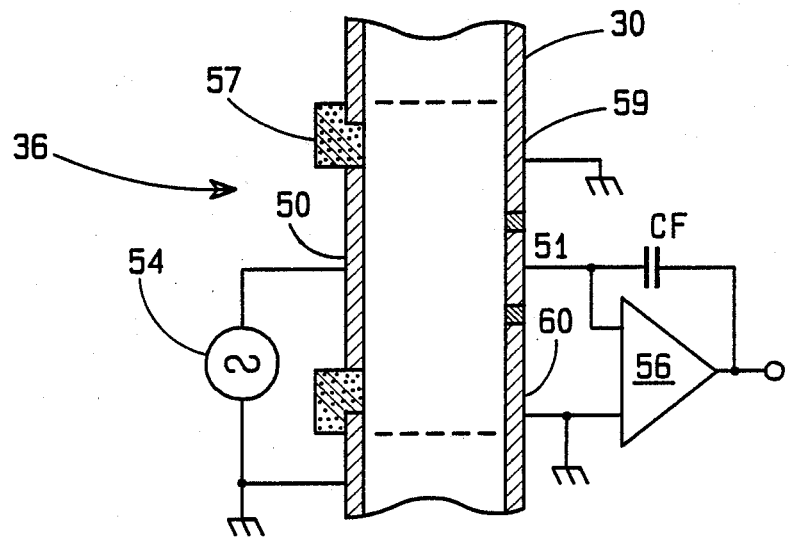
FIG. 4 shows another view of the densitometer.

Referring to FIGS. 3 and 4, in the preferred embodiment, densitometer 36 is a flat-plate type, equipped with a standard guard-surround. Insulation blocks 57 and 58, together with driving plate 50 and signal plate 51, accurately define the cross sectional area S over which the measurement is effective. The insulating material of blocks 57 and 58 is composite, consisting of an inner thin solid dielectric (for example, Kel-F) sheet backed by dielectric foam; the outer strip is again solid so as to provide mechanical strength. The rationale of this construction is the maintenance of a strictly uniform field well beyond the edges of the area S. All other construction features of the densitometer are standard, designed to ensure an unbiased density reading. The normally slightly larger concentration of solids along the centerplane causes an error of the order of 1% which can be corrected for by known formulae.

Plate 50 of the parallel plate capacitor is connected to an AC voltage source 54 operated at a few MHz. Guard-surround 59 and 60 is connected to reference ground potential. A wideband preamplifier 50 is connected to signal plate 51 in op-amp configuration, featuring a feedback capacitor CF, such that the output signal is proportional to the ratio CD/CF where CD=measured duct capacity. Processing of the signal by entirely digital means is fully described in copending patent application Ser. No. 146,509. Other details of the channel analog and digital computation electronics, can also be configured as described in patent application Ser. No. 146,509 which provides in particular, means of ensuring the necessary long-term stability and readout accuracy.

Referring again to FIG. 1, a transition section 70 forms the bottom of the vertical duct 30 changing the duct profile from rectangular to circular, in such a way that the solids are guided towards mixing tee 13. The shape of mixing tee 13 is dimensioned so as to take advantage of the average local particle velocity, changing its direction so as to promote rapid and smooth entry of solids into the gas stream and thereby lessening the chance of plugging as well as increasing the ratio of solids to gas flowrate (loading factor) the conveyor can sustain. In the preferred embodiment, the mixing tee 13 connecting the bottom of the vertical duct 30 to the horizontal duct 12 has been shaped in such a way as to present an impact surface to the free-falling solids stream at approximately 45 degrees with an exit to the horizontal duct 12 shaped so as to allow the solids, whose direction of motion has been deflected by the impact area so as to be roughly parallel to the gas flow, to enter the horizontal duct 12 freely without further wall impacts in the immediate vicinity of the downcomer.

Considering now the equations and formulae used in this system, the local solids velocity v is calculated by $$v = [2gd]^{\frac{1}{2}} + K(v)$$

where g=acceleration of gravity (corrected for altitude and latitude) and K(v) is a small correction factor. The solid volume fraction f is calculated from $$f = [(C(m) - C(0)]/[(3B - G)C(0) + GC(m)]$$

where $$B = (K-1)/(K+2),$$

$$G = B(1 + 2B) = (K-1)K/(K+2)^2$$

according to a second-order expansion of formulae by various authors given in the technical literature; K=dielectric constant of the solid; C(m) is the measured capacity and C(0) is the capacity as measured with empty duct. The foregoing equation is an approximation, however the error is negligible at the low average bulk densities the system provides.

Correction for bulk density variation through the volume can be provided by applying the factor $$H(f) = (3B - G)\{[f(max) + f(min)]/2 - f(ave)\}.$$

The expression [f(max)+f(min)]/2−f(ave) can be calculated for a number of models and turns out to be at least an order of magnitude smaller than the average solid fraction; it is therefore negligible under typical operating conditions of the system.

An empty-duct "reference" measurement is needed by all capacitive sensing schemes and can be provided by actually making an occasional empty-duct measurement or, preferably, by carefully matching a reference capacitor to the empty duct. The reference capacitor should thus not be designed for outstanding temperature immunity but rather, designed to match the temperature coefficient of the working capacitor. Effects of analog channel and component drift (for example, gain, feedback capacity, driving frequency, analog to digital conversion constant) can be entirely eliminated through a "track-switching" scheme also described in pending patent application Ser. No. 146,509.

The solids feedrate Q in weight per unit time is then computed from $$Q = Sfvw$$

where w=intrinsic solid density in appropriate weight and volume units, S=cross sectional area of the capacitor. All computations are readily provided on-line through the use of a simple computer such as a PC, equipped with the necessary interface. Equipment and control software needed for this on-line computation is commercially available at a modest cost. Specific software that embodies the foregoing equations can be produced in any convenient high-level language such as FORTRAN, PASCAL or C, or translated into machine language and written in PROM. Lastly, algorithms that make use of the readout for purposes of process control are available in general but would require specific parameters of the system. Driving hardware and software that operates stepping motors is commercially available at modest cost, for a variety of devices.

In the preferred embodiment the vertical duct has a rectangular cross section and the densitometer employs a parallel plate geometry. These configurations are preferred for simplicity and ease of construction while providing a high degree of accuracy. The accuracy of the readout of this invention depends on the accuracy of the densitometer and the densitometer accuracy depends on the uniformity the electric field between the capacitor plates, the thoroughness of coverage of the interior of the vertical duct, and the elimination of outside interference of the capacitor plate reading. With these considerations, other cross sectional geometries can be used for the vertical duct, such as a duct having a circular cross section. In an embodiment that employs a vertical duct having a circular cross section, a means for uniformizing the electric field between the capacitor plates would be necessary to provide a high degree of accuracy. Means for uniformizing the electric field produced by a capacitive densitometer are disclosed in co-pending application Ser. No. 146,509. Another change that would be necessary if a vertical duct of circular cross section is employed is in the basic design of the release valve which would have to configured as an iris of adjustable aperture. The release coefficient of such an iris tends to larger and has a stronger dependence on particle size, however, the simpler geometry of the duct and capacitor may be considered worth the added complexity of the release valve and the valve calibration.

The embodiments of this invention in which an exclusive property or privilege is claimed are defined as follows:

1. A flowmeter for measurement of solids feedrate in a gas-entrained solids flow conveyance system comprising:
   a vertical duct connected at the top end to a source of solids for gas-entrainment and connected at the bottom end to a gas-entrained flow conveyance system,
   a control valve positioned in said vertical duct capable of restricting the flow of solids so that below said control valve, the solids fall by force of gravity, and
   a capacitive densitometer positioned on said duct at a location a known distance below said control valve,
   whereby the solid feedrate, Q, of a gas entrained flow can be determined by $$Q = S\rho\phi v_s$$

where S is the cross sectional area of said duct, $\rho$ is the density of the solid, $\phi$ is the solid volume fraction determined by said capacitive densitometer, and $v_S$ is the local solid velocity which can be inferred from the known distance of said capacitive densitometer below said control valve.

2. The flowmeter of claim 1 in which said capacitive densitometer includes a means for uniformizing the electric field between the capacitor plates.

3. The flowmeter of claim 1 in which said capacitive densitometer includes a driving electrode plate and a receiving electrode plate positioned about said vertical duct so that a flow of solids in said vertical duct will pass between said driving electrode plate and said receiving electrode plate.

4. The flowmeter of claim 2 in which said control valve includes slidable blades capable of restricting the flow of solids in said vertical duct in such a way that a flow of solids is centered in said vertical duct.

5. The flowmeter of claim 4 including:
a feedhopper for the containment of solids and opening into the top of said vertical duct,
a second valve positioned in said vertical duct below said feedhopper and above said control valve, said second valve capable of completely stopping flow of solids in said vertical duct, and
an entry tee connecting the bottom of said vertical duct to the gas-entrainment conveyance system.

6. The flowmeter of claim 5 in which said entry tee is shaped to present an impact surface to a vertically falling solids stream from said vertical duct at approximately 45 degrees and further in which said entry tee includes an exit to the gas-entrainment conveyance system shaped so as to allow a flow of solids to enter the gas-entrainment conveyance system without further wall impacts.

7. The flowmeter of claim 6 in which said capacitive densitometer includes:
an oscillator connected to said driving electrode plate, said oscillator capable of sending a signal to said driving electrode plate, and
a preamplifier connected to said receiving electrode plate.

8. The flowmeter of claim 7 including a computer means connected to said densitometer, said computer means capable of calculating the flow of solids in said vertical duct.

9. The flowmeter of claim 8 in which said computer means is also connected to said control valve, and further in which said slidable blades of said control valve operate under the control of said computer means.

10. The flowmeter of claim 1 in which said vertical duct has a rectangular cross section and further in which said capacitive densitometer includes two parallel plates.

11. The flowmeter of claim 10 in which said capacitive densitometer includes a driving electrode plate and a receiving electrode plate.

12. The flowmeter of claim 10 including a grounded guard strip positioned outside the perimeter of said receiving electrode plate.

13. A method for measuring the feedrate of solids in a gas-entrained solids flow conveyance system comprising the steps of:
introducing a supply of solids into the top end of a vertical duct,
restricting the flow of solids the vertical duct with a control valve so that below the control valve, the solids fall by force of gravity,
measuring the solid volume fraction of the solids in the vertical duct with a capacitive densitometer positioned on the vertical duct at known distance below the control valve,
injecting the solids from the vertical duct into the gas-entrained conveyance system,
whereby the solid feedrate, Q, of a gas entrained flow can be determined in accordance with the equation $$Q = S\rho\phi v_S$$

where S is the cross sectional area of said duct, $\rho$ is the density of the solid, $\phi$ is the solid volume fraction determined by the capacitive densitometer, and $v_S$ is the local solid velocity which can be inferred from the known distance of the capacitive densitometer below the control valve.

14. The method of claim 13 in which the solid feedrate is calculated by a computer means connected to the capacitive densitometer.

15. The method of claim 14 in which the flow of solids in the vertical duct is restricted by the control valve under the control of the computer means.

* * * * *